(12) United States Patent
Self et al.

(10) Patent No.: US 9,690,876 B2
(45) Date of Patent: Jun. 27, 2017

(54) METHOD, APPARATUS, AND COMPUTER PROGRAM PRODUCT FOR PROVIDING SUPERVIEWS OF GEOSPATIAL ARRANGEMENTS

(71) Applicant: Change Healthcare LLC, Alpharetta, GA (US)

(72) Inventors: Bryan Self, Birmingham, AL (US); Josh Turner, Hueytown, AL (US); Preston Prewett, Sylvan Springs, AL (US)

(73) Assignee: CHANGE HEALTHCARE LLC, Alpharetta, GA (US)

( * ) Notice: Subject to any disclaimer, the term of this patent is extended or adjusted under 35 U.S.C. 154(b) by 521 days.

(21) Appl. No.: 14/211,331

(22) Filed: Mar. 14, 2014

(65) Prior Publication Data

US 2015/0261852 A1    Sep. 17, 2015

(51) Int. Cl.
*G06F 17/30*    (2006.01)

(52) U.S. Cl.
CPC .. *G06F 17/30991* (2013.01); *G06F 17/30864* (2013.01)

(58) Field of Classification Search
None
See application file for complete search history.

(56) References Cited

U.S. PATENT DOCUMENTS

| | | | | |
|---|---|---|---|---|
| 6,985,929 B1* | 1/2006 | Wilson | ............... | G06F 17/3087 |
| | | | | 701/532 |
| 8,762,555 B1* | 6/2014 | Peterson | ........... | G06F 17/30241 |
| | | | | 709/229 |
| 2002/0103895 A1* | 8/2002 | Chiang | ............... | H04L 12/2856 |
| | | | | 709/224 |
| 2007/0011669 A1* | 1/2007 | Varma | ....................... | G06F 8/51 |
| | | | | 717/168 |
| 2015/0156075 A1* | 6/2015 | Gist | ....................... | G06Q 10/06 |
| | | | | 709/201 |
| 2015/0310507 A1* | 10/2015 | Woodward | ............. | H04L 51/32 |
| | | | | 705/329 |

* cited by examiner

*Primary Examiner* — Christopher J Raab
(74) *Attorney, Agent, or Firm* — Alston & Bird LLP (57) ABSTRACT

A method is provided for providing superviews of geospatial arrangements. Users may configure a superview by providing a unit(s) and filtering criteria. Subunits belonging to the unit(s) and satisfying the filtering criteria may be displayed in a graphical superview, including additional pertinent information relative to the subunits. The graphical superview may be updated automatically to reflect the most up to date information. A server may be preconfigured to receive a superview configuration and automatically cause the corresponding graphical superview to be displayed on a client device.

19 Claims, 8 Drawing Sheets

METHOD, APPARATUS, AND COMPUTER PROGRAM PRODUCT FOR PROVIDING SUPERVIEWS OF GEOSPATIAL ARRANGEMENTS

TECHNOLOGICAL FIELD

Embodiments of the present invention relate generally to computer technology and, more particularly, to methods, apparatuses, and computer program products for creating and displaying configurable superviews of geospatial arrangements.

BACKGROUND

The widespread use of modern computing technology and improvements in visual media has led to an increasing demand for visual representations of data. The healthcare industry, among others, is one that utilizes geospatial arrangements to convey information in a visual format, efficiently and effectively to various units and individuals, such as throughout a hospital, for example. Doctors and staff may view a floor plan of patient rooms for a particular floor of a hospital to manage workflows and attend to patients. Extensive amounts of data relating to patients, staff, and practice groups, among others, may result in the display of an overwhelming amount of information.

BRIEF SUMMARY OF SOME EXAMPLE EMBODIMENTS

Methods, apparatuses, and computer program products are therefore provided for providing superviews of geospatial arrangements. According to example embodiments, superviews may be created for a user to configure a dynamic view of a geospatial arrangement such that only the subunits (e.g., rooms) of interest to the user are displayed at a given time.

A method is provided for providing a superview of a geospatial arrangement, the method comprising receiving an indication of a) at least one unit, and b) filtering criteria for filtering subunits of the at least one unit, wherein the unit and subunits are defined based on a physical location, saving the indications of the at least one unit and the filtering criteria as a superview configuration, marshalling data associated with the at least one unit from a remote storage device, unmarshalling the marshalled data and storing resulting data onto a local memory of a computing device, wherein the resulting data comprises a record for each subunit represented in the marshalled data, with a processor of the computing device, filtering the resulting data based on the filtering criteria to identify a current subset of the subunits of the at least one unit, and causing display of a graphical superview, wherein the graphical superview comprises a visual representation of the current subset of subunits.

In some examples, the marshalling is performed without respect to the filtering criteria and without respect to the at least one unit. In some embodiments, each of the subunits of the current subset of subunits is positioned within the graphical superview without respect to their corresponding geospatial arrangements.

In some embodiments, the method includes receiving an indication of a refresh interval for the graphical superview, in response to a passing of the refresh interval, repeating the marshalling, the unmarshalling, the storing resulting data, and the filtering to identify a new subset of the subunits, and causing the display of the graphical superview to be updated based on the new subset of subunits.

In some embodiments, the filtering criteria comprise a time range, and the current subset of the subunits is identified based on a timer of each respective subunit.

In some examples, the computing device is preconfigured to automatically perform the receiving of the indication of the at least one unit and the filtering criteria, wherein the indication of the at least on unit and the filtering criteria are received from a remote user device, the saving of the indications as a superview configuration, the marshalling of the data from the remote storage device, the unmarshalling of the marshalled data, the storing of the resulting data, wherein the storing comprises writing the resulting data to volatile memory of the computing device, and the causing display of the graphical superview on at least one of the remote user device or another remote user device.

In some examples, the filtering comprises saving an inclusion indicator on the computing device in association with each of the records, wherein each of the inclusion indicators is initially set to false, processing each of the records to determine whether a particular record satisfies the filtering criteria and is associated with the at least one unit, in an instance the particular record satisfies the filtering criteria, changing the inclusion indicator of the particular record to true, and identifying the current subset of subunits based on the inclusion indicators of the respective records.

An apparatus is also provided, the apparatus providing a superview of a geospatial arrangement, the apparatus comprising processing circuitry configured to cause the apparatus to perform at least, receiving an indication of a) at least one unit, and b) filtering criteria for filtering subunits of the at least one unit, wherein the unit and subunits are defined based on a physical location, saving the indications of the at least one unit and the filtering criteria as a superview configuration, marshalling data associated with the at least one unit from a remote storage device, unmarshalling the marshalled data and storing resulting data onto a local memory of the apparatus, wherein the resulting data comprises a record for each subunit represented in the marshalled data, filtering the resulting data based on the filtering criteria to identify a current subset of the subunits of the at least one unit, and causing display of a graphical superview, wherein the graphical superview comprises a visual representation of the current subset of subunits.

A computer program product is provided for providing a superview of a geospatial arrangement, the computer program product comprising at least one non-transitory computer-readable medium having computer-readable program instructions stored therein, the computer-readable program instructions comprising instructions, which when performed by an apparatus, are configured to cause the apparatus to perform at least: receiving an indication of a) at least one unit, and b) filtering criteria for filtering subunits of the at least one unit, wherein the unit and subunits are defined based on a physical location, saving the indications of the at least one unit and the filtering criteria as a superview configuration, marshalling data associated with the at least one unit from a remote storage device, unmarshalling the marshalled data and storing resulting data onto a local memory of the apparatus, wherein the resulting data comprises a record for each subunit represented in the marshalled data, filtering the resulting data based on the filtering criteria to identify a current subset of the subunits of the at least one unit, and causing display of a graphical superview, wherein the graphical superview comprises a visual representation of the current subset of subunits.

A system is provided for providing a superview of a geospatial arrangement, the system including a user device and server. The user device may be configured for receiving an indication of a) at least one unit, and b) filtering criteria for filtering subunits of the at least one unit, wherein the unit and subunits are defined based on a physical location, and transmitting the indications of the at least one unit and the filtering criteria to a server. The server may be configured for receiving the indications of the at least one unit and the filtering criteria to a server, saving the indications of the at least one unit and the filtering criteria as a superview configuration, marshalling data associated with the at least one unit from a remote storage device, unmarshalling the marshalled data and storing resulting data onto a local memory of the server, wherein the resulting data comprises a record for each subunit represented in the marshalled data, with a processor of the server, filtering the resulting data based on the filtering criteria to identify a current subset of the subunits of the at least one unit, and causing display of a graphical superview on at least one of the user device or another user device, wherein the graphical superview comprises a visual representation of the current subset of subunits.

An apparatus is provided for providing a superview of a geospatial arrangement, the apparatus including means for receiving an indication of a) at least one unit, and b) filtering criteria for filtering subunits of the at least one unit, wherein the unit and subunits are defined based on a physical location, means for saving the indications of the at least one unit and the filtering criteria as a superview configuration, means for marshalling data associated with the at least one unit from a remote storage device, means for unmarshalling the marshalled data and storing resulting data onto a local memory of the apparatus, wherein the resulting data comprises a record for each subunit represented in the marshalled data, means for filtering the resulting data based on the filtering criteria to identify a current subset of the subunits of the at least one unit, and means for causing display of a graphical superview, wherein the graphical superview comprises a visual representation of the current subset of subunits.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the disclosure in any way. It will be appreciated that the scope of the disclosure encompasses many potential embodiments, some of which will be further described below, in addition to those here summarized.

BRIEF DESCRIPTION OF THE SEVERAL VIEWS OF THE DRAWINGS

Having thus described embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As used herein, where a computing device is described to receive data from another computing device, it will be appreciated that the data may be received directly from the other computing device and/or may be received indirectly via one or more intermediary computing devices, such as, for example, one or more servers, relays, routers, network access points, and/or the like. Similarly, where a computing device is described herein to transmit data to another computing device, it will be appreciated that the data may be sent directly to the other computing device or may be sent to the other computing device via one or more interlinking computing devices, such as, for example, one or more servers, relays, routers, network access points, and/or the like.

Overview

A method, apparatus, and computer program product are provided for providing superviews of geospatial arrangements. According to example embodiments, superviews may be created for a user to configure a dynamic view of a geospatial arrangement such that only the subunits (e.g., rooms) of interest to the user are displayed.

Figure 1:
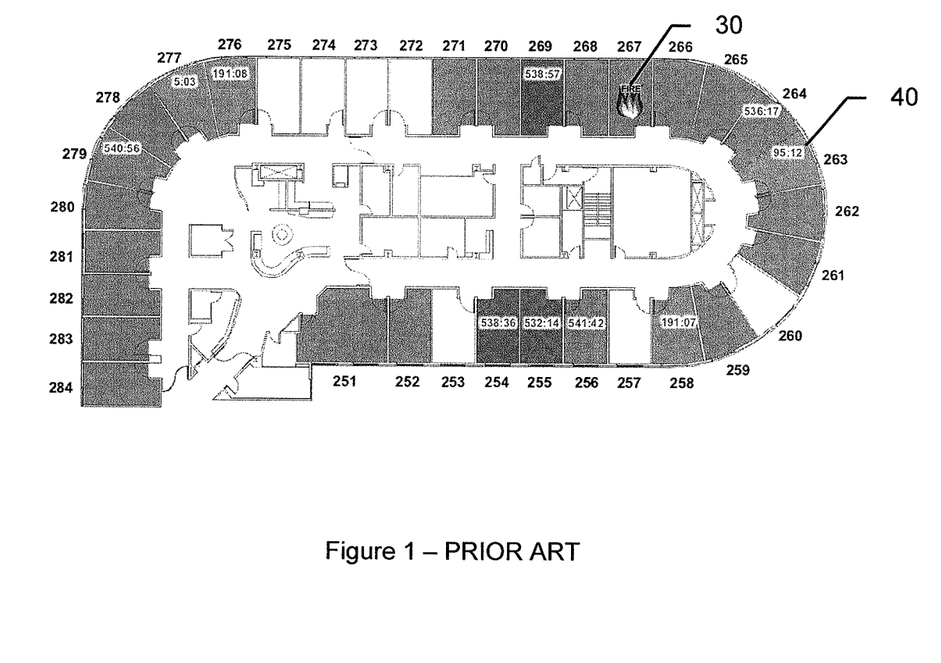
FIG. 1 is an example geospatial arrangement.

FIG. 1 illustrates a geospatial arrangement of a hospital floor. The geospatial arrangement provides information for the entire floor by room. Some rooms are color coded to provide statuses of rooms or patients in them. For example, for a cleaning crew, the geospatial arrangement may show color coded rooms to indicate which rooms are cleaned and which rooms are in need of cleaning. As an alternative use, the rooms may be color coded to indicate which rooms are occupied or vacant. Further, icon 30 indicates that an alarm has signaled in room 267, and timer 40 on room 263 indicates a countdown until a specified event or an elapsed time since a previously occurring event. The example geospatial arrangement may therefore provide pertinent information related to an entire floor or unit of the hospital in a visual format easily interpreted by a user.

In practical use, a user may not need information for an entire floor, but may be more interested in particular rooms throughout a building and on different floors that meet a certain criteria. For example, staff of the cleaning crew may want to view only those rooms that need to be cleaned as of a current or near-current time.

Some processes relating to users requesting custom views of geospatial arrangements may require building Structured Query Language (SQL) queries (including complex wherein clauses) to a server for each individual request. Such processes relying on building and compiling a server may result in a lag time (potentially several months, or more) between the request and availability of the custom view to the user.

For example, based on filtering criteria or parameters provided by the user, a hard coded query including a wherein clause to filter or limit the data must be written or generated. Furthermore, expensive SQL queries run on a remote database may cause performance issues and delay in providing the most up to date information. Such implementations may make on-the-fly requests for custom views nearly impossible to provide. Embodiments provided herein may provide a seamless, efficient process by which users may configure and customize superviews of geospatial arrangements, without the lag time due to a build to a server, and without the expensive processing of data on the database.

According to example embodiments, a user may create a superview of a geospatial arrangement, such that only rooms satisfying predefined criteria are displayed. The superview may be refreshed such that certain rooms may appear as certain criteria is met, or disappear from view when the criteria is no longer met. A computing device, such as a server, may be preconfigured to receive superview configurations, such that a new build to a server is not required. Relevant data may be written to local memory and processed more efficiently than expensive queries to the database. A superview server as described herein is one example of a computing device configured to receive such superview configurations, but it will be appreciated that any reference to the term, "superview server," may include any suitable computing device.

In some examples, superviews may eliminate the need for a user to analyze a large number of rooms to determine whether particular criteria are met. Medical facilities in particular may benefit from superviews so that users may quickly identify relevant information. Example embodiments also provide for cloning and editing of superviews and sharing amongst users.

Although a hospital is used throughout as an example embodiment, it will be appreciated that the embodiments provided herein may be beneficial to many other fields and uses. The hospital environment is cited as a non-limiting example, and should not be construed to narrow the scope or spirit of the disclosure in any way.

Example Embodiments

Figure 2:
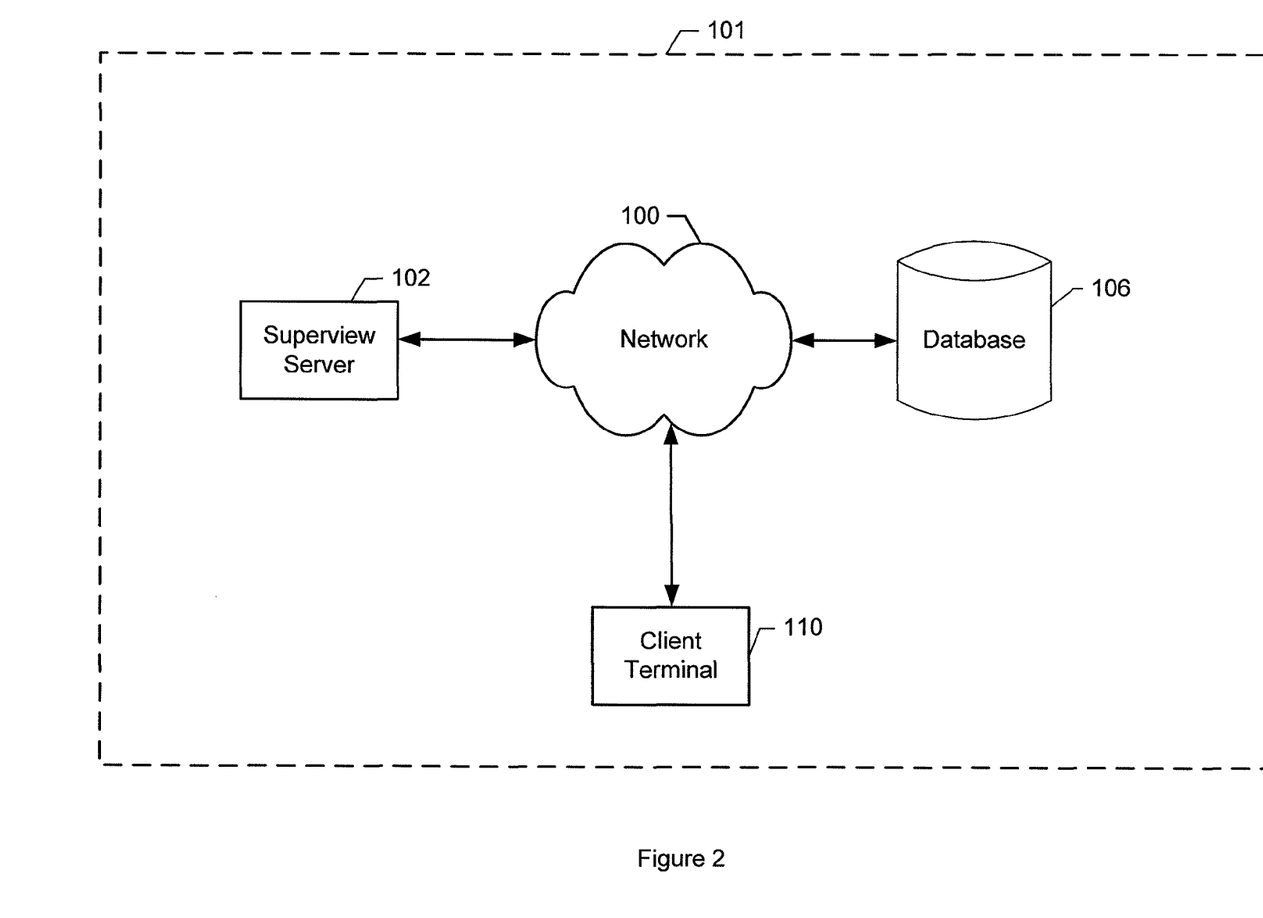
FIG. 2 is a block diagram of a system for providing superviews according to some example embodiments.

FIG. 2 illustrates a system 101 for providing superviews according to some example embodiments. It will be appreciated that the system 101, as well as the illustrations in other figures, are each provided as an example of an embodiment(s) and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system, numerous other configurations may also be used to implement embodiments of the present invention.

The system 101 may include a network 100, superview server 102, database 106, and/or a client, such as a client terminal 110. In some example embodiments, superview server 102 may be embodied as or comprise one or more computing devices. In some example embodiments, superview server 102 may be implemented as a distributed system or a cloud based entity that may be implemented within network 100. In this regard, superview server 102 may comprise one or more servers, a server cluster, one or more network nodes, a cloud computing infrastructure, some combination thereof, or the like.

Superview server 102 may be configured to store superview configurations and provide filtered superview data, and/or a graphical superview for display by a client terminal 110. In this regard, a superview configuration may comprise user specified criteria, such as an identifier(s) of unit(s) (e.g., floors or units within a healthcare facility) for which subunits (e.g., rooms) will be filtered, and/or the filtering criteria for filtering the subunits of the identified unit(s). The filtered subsets may be considered the data or information identifying the subset of subunits that satisfy the criteria at any given time, and/or any data associated with a subunit of the subset. Each subunit may be defined based on a physical location (e.g., a room on a floor of a building, address, or other geographical location). A graphical superview may therefore refer to the display of the subset of subunits, which may be displayed with or without regard to their respective geospatial arrangements. The graphical superview may also provide data associated with any of the displayed subunits, regardless of whether the data was considered in the filtering process. For example, a patient name may be displayed for any rooms satisfying the filtering criteria that the room is cleaned.

According to the example embodiments provided herein, superview server 102 may be further configured to receive real-time or near real-time information related to any or all of the subunits, such as from database 106, for example. The superview server 102 may then filter the data, and provide the graphical superview to client terminal 110. Graphical superviews may be provided to client terminal 110 via a web application, for example. In this regard, superview server 102 may additionally or alternatively be implemented as a web server. In some embodiments, raw data (e.g., the filtered superview data) may be transmitted from the superview server 102 to the client terminal 110, and an application installed on the client terminal 110 may generate the graphical superview for display. It will therefore be appreciated that any reference to causing display of a graphical superview may comprise transmitting the data for the graphical superview to be generated on the client terminal 110, or transmitting the graphical superview (e.g., image).

The superview server 102 may be configured to retrieve data from any number of databases 106 via network 100, for example. The database 106 may be embodied as or comprise one or more computing devices configured to store data and provide data upon request to components of system 101. In some examples database 106 may be configured to maintain large volumes of data on non-volatile storage and may have a memory capacity exceeding the memory capacity of the superview server 102. In this regard, database 106 may be implemented as a data warehouse and may comprise, or otherwise communicate with the superview server 102 via a data integration layer. Database 106 may be updated by any number of servers and/or subsystems of system 101, thereby providing a consolidated and/or comprehensive data source for use by superview server 102.

In example embodiments provided herein, the database 106 may be operative to store information associated with the infrastructure of a medical facility (e.g., hospital). For example, the database 106 may be used to systematically manage any information such as patient statuses, physician shift schedules, and/or nurse assignments, among others. The database 106 may be configured to receive data from any apparatus of the system 101 and/or external from system 101, such as from a third party system. The database 106 may operate independently from superview server 102 and/or under different ownership than that of the superview server 102, but it will be appreciated that in some embodiments, the database 106 may indeed be operated, separately, but nonetheless by the same entity in control of the superview server 102.

Although FIG. 2 depicts one database 106, in some embodiments, any number of databases 106 may be present. In example embodiments provided herein, database 106 may be configured to operate under control of a database management system (DBMS). In some examples, database 106 may be configured to provide data to various servers and/or subsystems of the system 101 as limited by particular parameters, such as specified by a where clause of SQL, for example. In such examples, the processing time may be very expensive, as the where clause performed on the database 106 may require processing and/or comparison of individual values on the database 106. In preferred embodiments described herein, a call to the database 106 may be made more efficiently by excluding a wherein clause. For example, a retrieval from the database 106 may be made by a simple SQL query such as, "SELECT * FROM Patient." Such a query may be more efficient than a query including a "where clause," since it avoids the expensive data processing of individual data fields on the database 106. As described herein, the database 106 may be additionally or alternatively configured to provide available and relevant information with regard to a subunit (e.g. room) to the superview server 102, so that the information may be filtered and provided for the client terminal 110 to display in the form of a graphical superview.

In some embodiments, the data provided by database 106 may be associated with an entity without regard to physical location, such as a patient or staff member, for example. In such an embodiment, the superview server 102 may use room assignment data or other information (which may be provided by a database 106 or third party system), to associate the entity to a physical location or subunit, such that visual representation of the information may be applied to a superview.

Any number of client terminals 110 may be embodied as a user terminal such as a laptop computer, tablet computer, mobile phone, desktop computer, workstation, or other like computing device. The client terminal 110 may be remote from the superview server 102 and/or database 106, in which case the client terminal 110 may communicate with any of the respective apparatuses via network 100. Additionally or alternatively, a client terminal 110 may be implemented on a superview server 102. Client terminal 110 may be used to access an application provided by the superview server 102, such as a maintenance tool to configure superviews, and/or a web application for viewing a graphical superview. As such, in example embodiments, physicians, staff, and/or other individuals may use client terminal 110 to view graphical superviews and related information provided by the database 106 via superview server 102 (and network 100).

Communication between client terminal 110 and superview server 102 may occur via network 100, and the client terminal 110 may request and receive data from the superview server 102 in such a manner that the superview server 102 operates as a blackbox server. Storing of the superview configurations, filtering of the data, and generation of the graphical superview may be performed by the superview server 102, deeming the client terminal 110, in some embodiments, a thin client. In some examples, a superview configuration may be provided to the superview server 102 by one client terminal 110, and the corresponding graphical superview provided for display on another client terminal 110. Any number of client terminals 110 may be present in system 101.

Network 100 may be embodied in a local area network, the Internet, any other form of a network, or in any combination thereof, including proprietary private and semi-private networks and public networks. The network 100 may comprise a wired network, wireless network (e.g., a cellular network, wireless local area network, wireless wide area network, some combination thereof, or the like), or a combination thereof, and in some example embodiments comprises at least a portion of the Internet.

Figure 3:
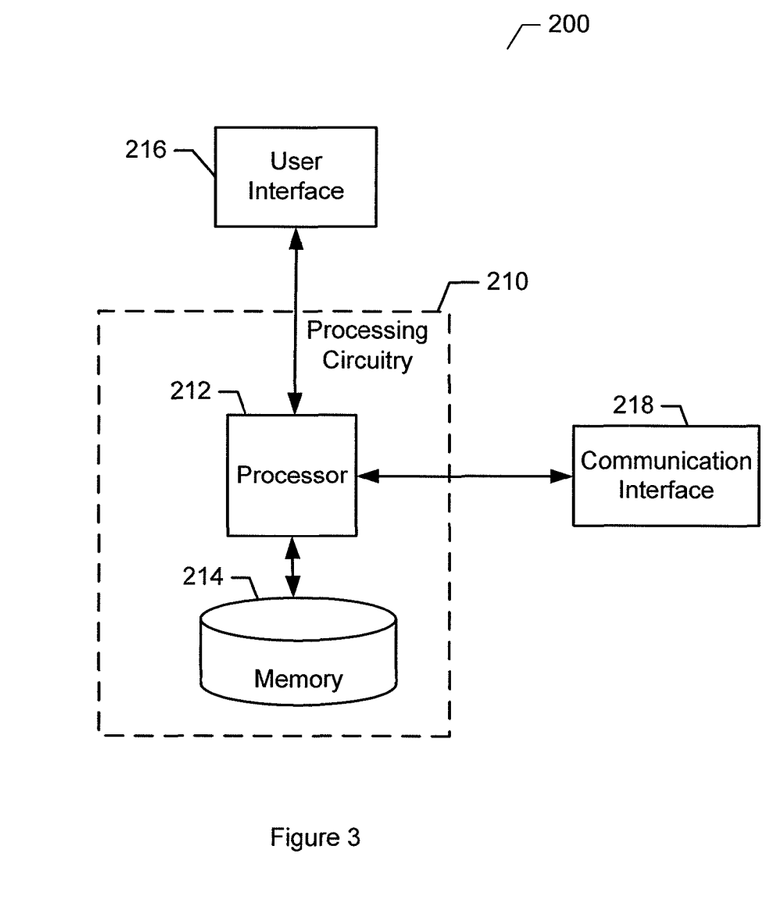
FIG. 3 is a block diagram of an apparatus for providing superviews according to some example embodiments.

FIG. 3 illustrates an example apparatus 200 that may implement superview server 102, and/or client terminal 110, in accordance with some example embodiments. However, it should be noted that the components, devices, and elements illustrated in and described with respect to FIG. 3 below may not be mandatory and thus some may be omitted in certain embodiments. For example, FIG. 3 illustrates a user interface 216, as described in more detail below, which may be provided by the client terminal 110, but may be optional in the superview server 102. Additionally, some embodiments may include further or different components, devices, or elements beyond those illustrated in and described with respect to FIG. 3.

Continuing with FIG. 3, processing circuitry 210 may be configured to perform actions in accordance with one or more example embodiments disclosed herein. In this regard, the processing circuitry 210 may be configured to perform and/or control performance of one or more functionalities of superview server 102, and/or client terminal 110 in accordance with various example embodiments. The processing circuitry 210 may be configured to perform data processing, application execution, and/or other processing and management services according to one or more example embodiments. In some embodiments, superview server 102, and/or client terminal 110, or a portion(s) or component(s) thereof, such as the processing circuitry 210, may be embodied as or comprise a computing device, e.g., an integrated circuit or other circuitry. The circuitry may constitute means for performing one or more operations for providing the functionalities described herein.

In some example embodiments, the processing circuitry 210 may include a processor 212, and in some embodiments, such as that illustrated in FIG. 3, may further include memory 214. The processing circuitry 210 may be in communication with or otherwise control a user interface 216, and/or a communication interface 218. As such, the processing circuitry 210 may be embodied as a circuit chip (e.g., an integrated circuit) configured (e.g., with hardware, software, or a combination of hardware and software) to perform operations described herein.

The processor 212 may be embodied in a number of different ways. For example, the processor 212 may be embodied as various processing means such as one or more of a microprocessor or other processing element, a coprocessor, a controller, or various other computing or processing devices including integrated circuits such as, for example, an ASIC (application specific integrated circuit), an FPGA (field programmable gate array), or the like. Although illustrated as a single processor, it will be appreciated that the processor 212 may comprise a plurality of processors. The plurality of processors may be in operative communication with each other and may be collectively configured to perform one or more functionalities of superview server 102, and/or client terminal 110 as described herein. The plurality of processors may be embodied on a single computing device or distributed across a plurality of computing devices collectively configured to function as superview server 102, and/or client terminal 110. In some example embodiments, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA, or the like, the processor 212 may be specifically configured hardware for conducting the operations described herein. Alternatively, as another example, when the processor 212 is embodied as an executor of software instructions, the instructions may specifically configure the processor 212 to perform one or more operations described herein.

In some example embodiments, the memory 214 may include one or more non-transitory memory devices such as, for example, volatile and/or non-volatile memory that may be either fixed or removable. In this regard, the memory 214 may comprise a non-transitory computer-readable storage medium. It will be appreciated that while the memory 214 is illustrated as a single memory, the memory 214 may comprise a plurality of memories. The plurality of memories may be embodied on a single computing device or may be distributed across a plurality of computing devices collectively configured to function as superview server 102, and/or client terminal 110. The memory 214 may be configured to store information, data, applications, instructions and/or the like for enabling superview server 102, and/or client terminal 110 to carry out various functions in accordance with one or more example embodiments. For example, the memory 214 may be configured to buffer input data for processing by the processor 212. Additionally or alternatively, the memory 214 may be configured to store instructions for execution by the processor 212. As yet another alternative, the memory 214 may include one or more databases that may store a variety of files, contents, or data sets. For example, when apparatus 200 is implemented as superview server 102, the memory 214 may be configured to store superview configurations. Among the contents of the memory 214, applications may be stored for execution by the processor 212 to carry out the functionality associated with each respective application. In some cases, the memory 214 may be in communication with one or more of the processor 212, user interface 216, and/or communication interface 218, for passing information among components of superview server 102, third party system 104, and/or client terminal 110.

According to example embodiments described herein, the memory 214 of superview server 102 may be used to temporarily store data marshalled from the database 106 for the purpose of improved efficiency. In this regard, the memory 214 may include volatile memory, such as random-access memory (RAM). The data written to volatile memory (e.g., memory 214) of the superview server 102 may be processed and filtered more efficiently than by querying the database 106, for example. Memory 214 may additionally or alternatively comprise data cached by the processor 212.

The user interface 216 may be in communication with the processing circuitry 210 to receive an indication of a user input at the user interface 216 and/or to provide an audible, visual, mechanical, or other output to the user. As such, the user interface 216 may include, for example, a keyboard, a mouse, a joystick, a display, a touch screen display, a microphone, a speaker, and/or other input/output mechanisms. As such, the user interface 216 may, in some example embodiments, provide means for user control of managing or processing data access operations and/or the like. For example, in instances apparatus 200 is implemented as a client terminal 110, a user may provider parameters for configuring a superview via the user interface 216. The user interface 216 may additionally or alternatively display a graphical superview.

In some example embodiments in which superview server 102 is embodied as a server, cloud computing system, or the like, aspects of user interface 216 may be limited or the user interface 216 may not be present. Accordingly, regardless of implementation, the user interface 216 may provide input and output means in accordance with one or more example embodiments, such as displaying a graphical superview.

The communication interface 218 may include one or more interface mechanisms for enabling communication with other devices and/or networks. In some cases, the communication interface 218 may be any means such as a device or circuitry embodied in either hardware, or a combination of hardware and software that is configured to receive and/or transmit data from/to a network and/or any other device or module in communication with the processing circuitry 210. By way of example, the communication interface 218 may be configured to enable communication among superview server 102, database 106, and/or client terminal 110 via network 100. Accordingly, the communication interface 218 may, for example, include supporting hardware and/or software for enabling wireless and/or wired communications via cable, digital subscriber line (DSL), universal serial bus (USB), Ethernet, or other methods.

Figure 4:
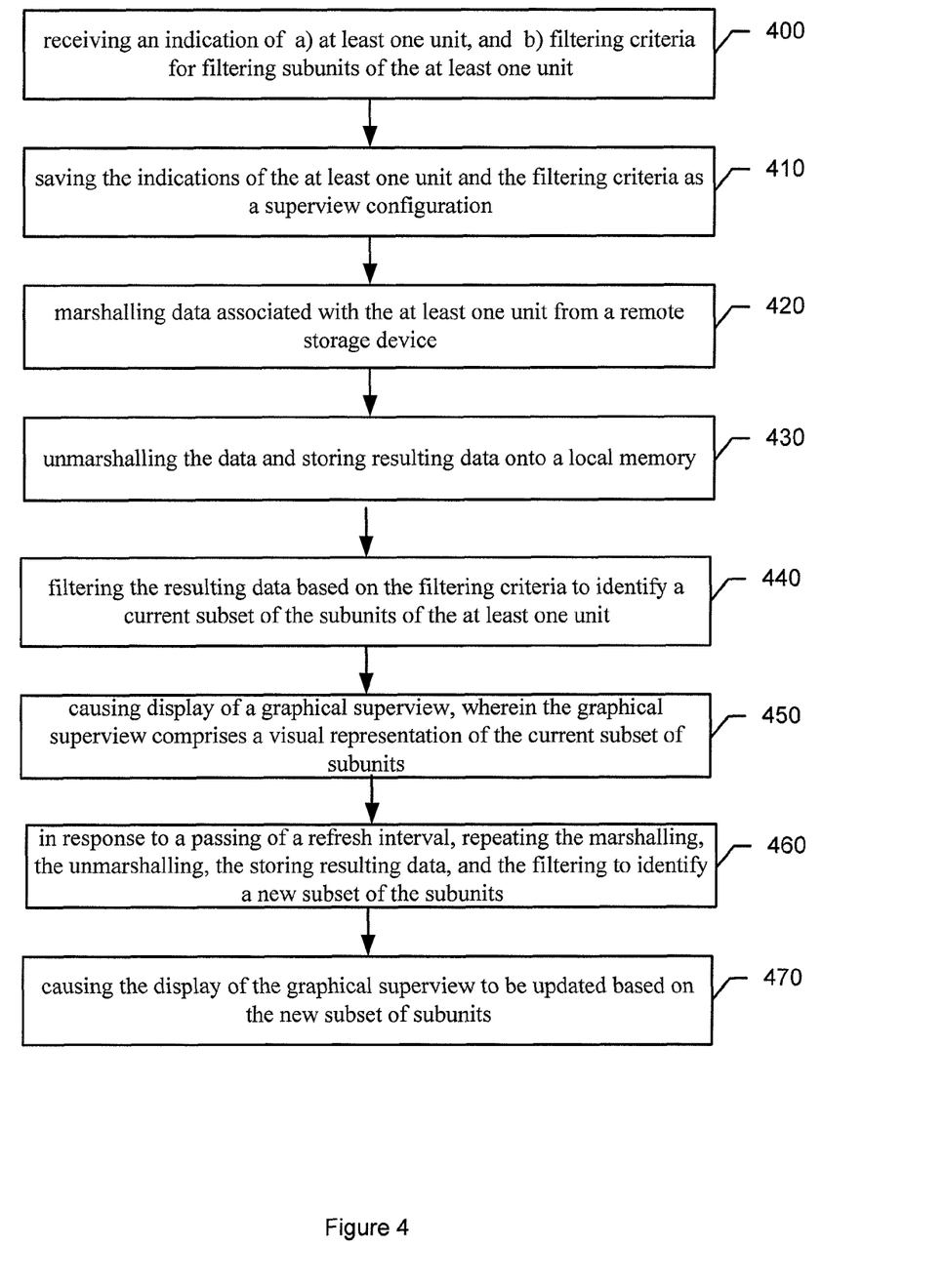
FIG. 4 is a flowchart of operations for providing superviews according to some example embodiments.

FIG. 4 is a flowchart illustrating example operations of superview server 102 according to an example embodiment. As shown by operation 400, the superview server 102 may include means, such as user interface 216, communication interface 218, processor 212, and/or the like, for receiving an indication of at least one unit, and filtering criteria for filtering subunits of the at least one unit. For example, a user may access a display, such as the example display of FIG. 6 described below, to provide a selection of at least one unit. The user may select from floors in a building, a clinical unit, and/or the like. The unit may be defined by a geographic location, and may comprise any number of subunits. For example, in an instance a floor of a building is selected as a unit, subunits of the floor may be individual rooms, and/or groups of rooms.

In addition to selecting at least one unit, the user may provide filtering criteria for filtering the subunits. In example embodiments, the filtering criteria may be quantitative. For example, the filtering criteria may limit the subunits to rooms housing patients with vital signs above a specified threshold. As another example, filtering criteria may include a time range in which an event may occur in a subunit, In some embodiments, the filtering criteria may be categorical, such as relating to a state of a room (e.g., cleaned or not cleaned), a patient (e.g., demographic information), a patient status or class type (e.g., inpatient, outpatient, observation patient, emergency, pre-admit patient), bed requests (e.g., psych bed, obese bed, telemetry bed), patients with acuity (e.g., levels 1, 2, 3, 4, or 5) or any pertinent medical information, staff assignments, and/or the like. In some examples, location filters may be provided, such as, a current location, schedule to location, schedule from location, currently in transit to, currently in transit from. The location filters may assist a staff member in monitoring patients in a particular area or the movement of patients. In some examples, filtering criteria may be indicated as a Boolean value. For example, a filtering criteria may limit the subunits to rooms housing patients in critical condition (e.g., critical=true). For example, patients with case alerts and/or with room isolation may be filtered. As another example, user defined attributes may be filtered on, for example, "fall risk" or "NPO" (non per os, or, nothing by mouth).

In some embodiments, in addition to the indication of at least one unit and the filtering criteria, the superview server 102 may receive an indication(s) of display fields for which information may be displayed in association with each subunit. For example, the user may desire that the display fields include a patient name of the patient in the room, a countdown timer until a specific event, and/or the like.

In some embodiments, the superview server 102 may receive an indication of a refresh internal indicating how often an associated graphical superview (described in further detail below) may be refreshed.

As shown by operation 410, the superview server 102 may include means, such as processor 212, memory 214 and/or the like, for saving the indication of the at least one unit and the filtering criteria as a superview configuration. In this regard, any of the at least one unit, the filtering criteria, the refresh interval, the indication of the display fields, and/or the like, may be saved to memory 214, or other memory on or accessed by the superview server 102. In some examples, the superview configuration may have an associated unique identifier, assigned administrator (e.g., user identifier of the creator), and/or the like. In this regard, users of various client terminals 110 may access the superview configuration on the superview server 102 (e.g., to request display of an associated graphical superview).

As shown by operation 420, the superview server 102 may include means, such as processor 212, memory 214, communication interface 218, and/or the like, for marshalling data associated with the at least one unit from a remote storage device. For example, the database 106 may be considered the remote storage device as it is remote from the superview server 102. Marshalling may include retrieving the data and transforming the data for transmission, as described in further detail below.

The data marshalled by the superview server 102 may be defined in a variety of ways. For example, the superview server 102 may be configured to retrieve all data available on the database 106. For example, an SQL query such as "SELECT * FROM all_tables" may be made, where all_tables represents all tables of the database 106. As an alternative, in some embodiments, the superview server 102 may only query relevant tables of the database 106, for example, as defined by available filters displayed to a user configuring a superview, such as in FIG. 6, described below. For example, an SQL query such as "SELECT * FROM Patient" may be made, where Patient represent the table(s) comprising the relevant information that may be processed to determine if a subunits satisfies the filtering criteria. The indicated table(s) may additionally comprise data to be displayed on a graphical superview (but not necessarily filtered). The superview server 102 may therefore retrieve any data that could potentially be requested based on a superview configuration, such as for all rooms in a hospital, or other physical location. In this regard, the superview server 102 may marshal data for all units, and/or all fields, parameters, tables, and/or the like associated with all known or available units. Said differently, the data may be marshalled without respect to the at least one unit indicated by the superview configuration, and/or without respect to the filtering criteria indicated by the superview configuration, and received with respect to operation 400. As another alternative, in some examples, only the data corresponding to the at least one unit may be marshalled, but without respect to the filtering criteria. The marshalled data may therefore comprise a larger amount of data than what will be provided in the graphical superview (described in further detail with respect to operation 450 below) following filtering methods described below with respect to operation 440.

In some examples, the marshalling occurs in response to the storing of the superview configuration, as described with respect to operation 410. In some examples, the marhalling occurs in response to passing of a refresh interval, as described in further detail below with respect to operation 460, below. In some examples, the marshalling occurs in response to a request to view a graphical superview, which in some embodiments, may be initiated from a different client terminal 110 than the client terminal 110 from which the superview configuration originated (e.g., with respect to operation 400).

In some embodiments, the marshalling may include making a lightweight call to retrieve all, or a larger set of available data from the database 106, such as, "SELECT * FROM Patient." Such a retrieval may be relatively inexpensive (e.g., have a short processing time) in comparison to the relatively expensive computations required by SQL queries comprising where clauses, performing the expensive computations on the relatively slow database 106. In some embodiments, the marshalling may include converting and/or buffering the data retrieved from the database 106 into a format that may be efficiently transmitted over network 100 and to the superview server 102.

As shown by operation 430, the superview server 102 may include means, such as processor 212, memory 214, and/or the like, for unmarshalling the data and storing resulting data of the unmarshalling onto a local memory. In some embodiments, the unmarshalling may include converting the marshalled data to a format that can be written to the local memory (e.g., memory 214) of the superview server 102. In particular, the resulting data may be written to cache, RAM, and/or another volatile medium. In this regard, the resulting data may be efficiently accessed and processed by the processor 212. In some embodiments, the resulting data comprises a record for each subunit represented in the marshalled data.

As shown by operation 440, the superview server 102 may include means, such as processor 212, memory 214, and/or the like, for filtering the resulting data based on the filtering criteria to identify a current subset of the subunits of the at least one unit that satisfy the criteria designated by the user. Filtering is described in more detail with respect to FIG. 5 below. The identified current subset of the subunits may include any data relating to subunits satisfying the filtering criteria.

As shown by operation 450, the superview server 102 may include means, such as processor 212, communication interface 218, user interface 216, and/or the like, for causing display of a graphical superview, wherein the graphical superview comprises a visual representation of the current subset of subunits and respective marshalled data. In this regard, the superview server 102 may direct the client terminal 110 to display the graphical superview associated with a request from the client terminal 110 (e.g., such as requested via operation 400, or a subsequent request from any client terminal 110). In some embodiments, each of the subunits of the current subset of subunits may be positioned within the graphical superview without respect to their corresponding geospatial arrangements. In some embodiments, the graphical superview may convey information relating to any or each of the subunits. The fields and/or types of information displayed may be configured by a user and received by the superview server 102 during operation 400, for example. An example graphical superview is provided and described with respect to FIG. 8 below.

As shown by operation 460, the superview server 102 may include means, such as processor 212, communication interface 218, user interface 216, and/or the like, for, in response to passing of a refresh interval, repeating the marshalling, unmarshalling, storing of resulting data, and filtering to identify a new subset of the subunits that satisfy the indicated criteria as of the time of the refresh. In some embodiments, a superview configuration may include a refresh interval, as may be indicated by a user and received by the superview server 102 such as in operation 400. While a client terminal 110 is requesting to view a graphical superview associated with a superview configuration, the superview server 102 may monitor the passing of time and cause the graphical superview to update upon each refresh interval, as described below with respect to operation 470. The client terminal 110 may therefore provide a continuous display of the graphical superview, which may be updated automatically based on the refresh interval.

As shown by operation 470, the superview server 102 may include means, such as processor 212, communication interface 218, user interface 216, and/or the like, for causing the display of the graphical superview to be updated based on the new subset of subunits. In some embodiments, causing the display to be updated may be performed by the same operations as operation 450. In some examples, some subunits may appear or disappear based on the new subset of subunits identified in operation 460. In some embodiments, the information provided in relation to a display field(s) relating to a subunit may change, even if the subunit is displayed prior to the update. For example, a timer relating to a particular sub unit may be updated, regardless of whether the subunit is a newly displayed subunit, or was previously displayed on the graphical superview.

Figure 5:
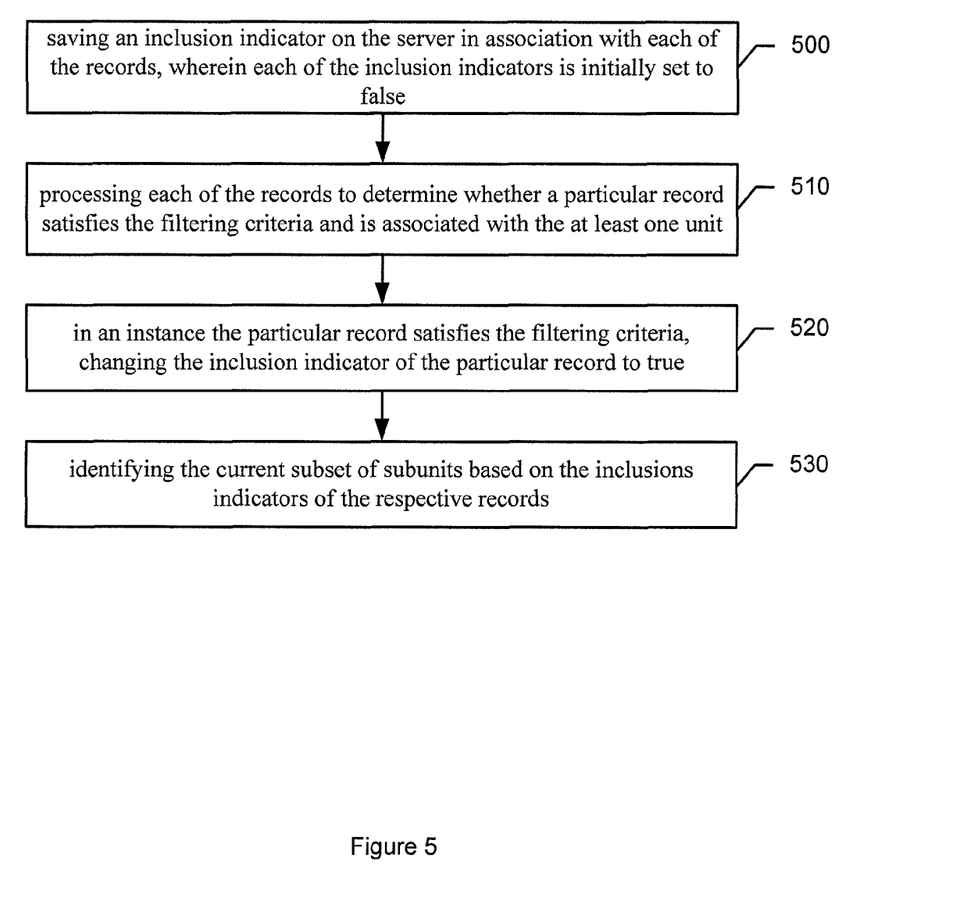
FIG. 5 is a flowchart of operations for filtering according to some example embodiments.

FIG. 5 is a flowchart illustrating example operations of superview server 102 according to an example embodiment. The operations of FIG. 5 are example operations that may be performed for filtering the resulting data, as may be performed during operation 440, introduced above.

As shown by operation 500, the superview server 102 may include means, such as processor 212, memory 214, and/or the like, for saving an inclusion indicator on the server in association with each of the records, wherein each of the inclusion indicators is initially set to false. Said differently, the inclusion indicator may be a binary field defaulted to "false," or "do not include," once new data is stored to the memory 214.

As shown by operation 510, the superview server 102 may include means, such as processor 212, memory 214, and/or the like, for processing each of the records to determine whether a particular record satisfies the filtering criteria and is associated with the at least one unit. For example, the processor 212 may traverse the records, one by one, and determine whether each record and its corresponding data represent a subunit associated with the at least one unit, and whether the corresponding data satisfies the filtering criteria. In some examples, if a record is not associated with the at least one unit, the subunit will not be included and the processor 212 need not waste computations on testing the filtering criteria. In such examples, the processor 212 may proceed to evaluating the next available record.

As shown by operation 520, the superview server 102 may include means, such as processor 212, memory 214, and/or the like, for in an instance when the particular record satisfies the filtering criteria and is associated with the at least one unit, changing the inclusion indicator of the particular record to "true," or "include."

As shown by operation 530, the superview server 102 may include means, such as processor 212, memory 214, and/or the like, for identifying the current subset of subunits based on the inclusion indicators of the respective records. The current subset of subunits may therefore be determined by identifying all respective records having an inclusion indicator of "true," or "include." The current subset of subunits may not include records having an inclusion indicator of "false," or "do not include."

Figure 6:
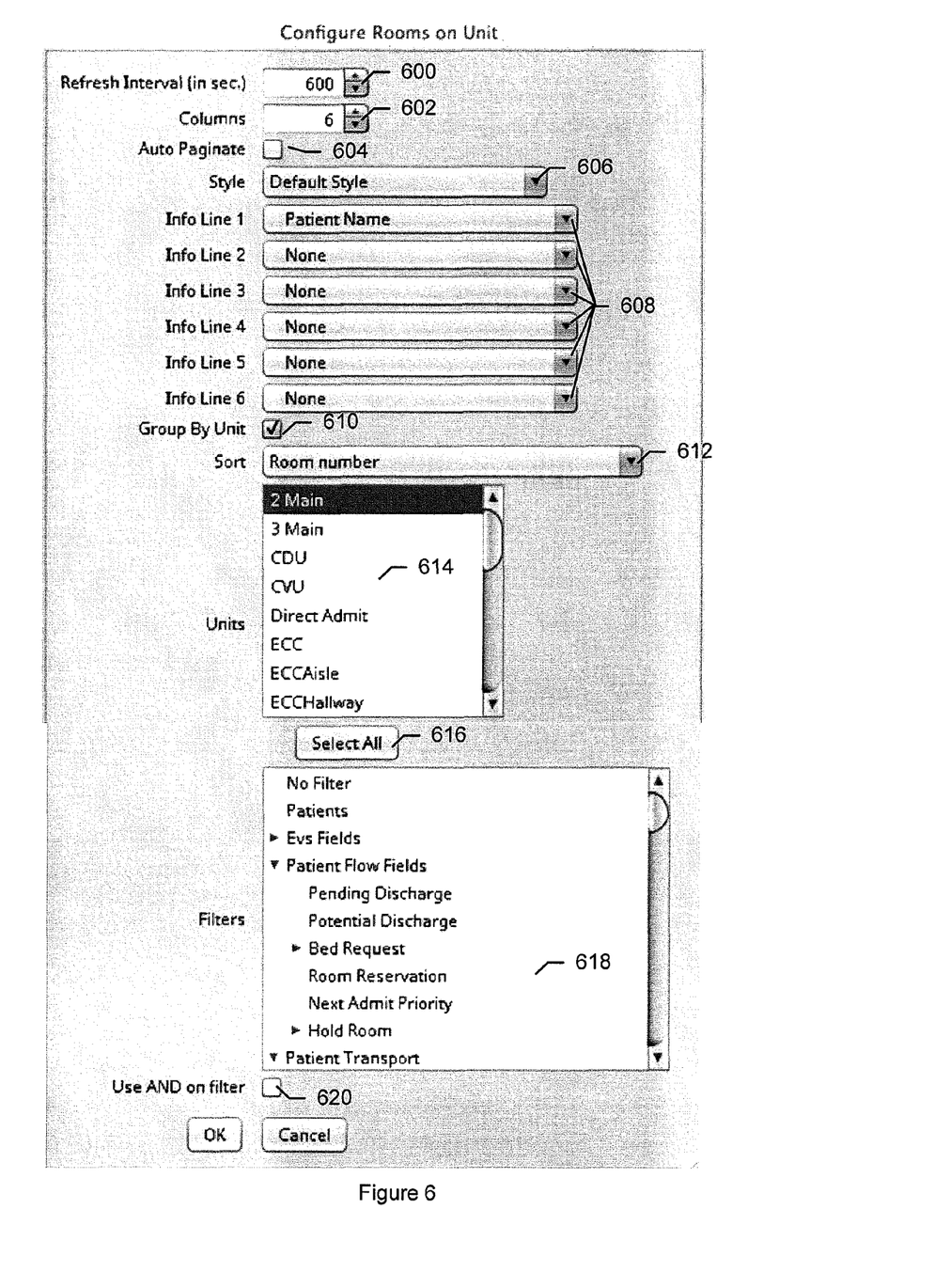
FIGS. 6 and 7 are example displays for configuring a superview according to some example embodiments.

FIG. 6 is an example display used for configuring a superview according to some example embodiments. In this regard, a user may access a display such as that of FIG. 6 to create and/or edit a superview configuration that may be stored to superview server 102 and/or may be accessed by the client terminal 110 to view an associated graphical superview. As shown by indicator 600, a user may indicate a refresh interval, in seconds, in which the graphical superview is updated. The refresh interval may therefore specify how often the current subset of subunits and/or the information depicted on the graphical superview is updated. A user working in a fast pace emergency environment may therefore configure refreshes to occur on a relatively short time interval, whereas a user monitoring statuses of stable patients, or the progress of meal service, for example, may configure refreshes to occur less frequently.

As shown by indicator 602, a user may configure the number of columns of subunits to be displayed, and/or auto paginate with indicator 604. Styles with which the graphical superview is displayed may be selected, such as with dropdown menu 606. Display fields to be displayed on the graphical superview, such as patient name, may be selected, such as in dropdown menus 608. Selection of the indicator 610 may indicate that the subunits are to be displayed and/or grouped by an associated unit. For example, in instances in which the current subset of subunits comprises subunits from more than one unit, the subunits may be visually distinguished from one another based on their respective unit.

The subunits may be sorted according to various factors, such as room number, such as with dropdown menu 612. The selection box 614 enables a user to select any potential units from which a current subset of subunits may be identified. In some embodiments, the operations may include floor numbers of a building, clinical units, and/or the like. Selection of indicator 616 may result in selection of all options in selection box 614.

Selection box 618 may allow a user to provide filtering criteria based on various conditions and/or categorizations. In some embodiments, mere selection of a filter may indicate filtering criteria based on a subunit's inclusion in a particular category and/or state. In some embodiments, parameters to the filtering criteria may also be provided, as described below with respect to FIG. 7. Selection of the AND indicator 620 may indicate that all of the filtering criteria associated with a superview configuration must be met for a particular subunit to satisfy the filtering criteria and to be included in the graphical superview. In an instance in which the AND indicator 620 is not selected, only one of the filtering criteria need be satisfied for a particular subunit for the subunit to be included in the graphical superview.

Figure 7:
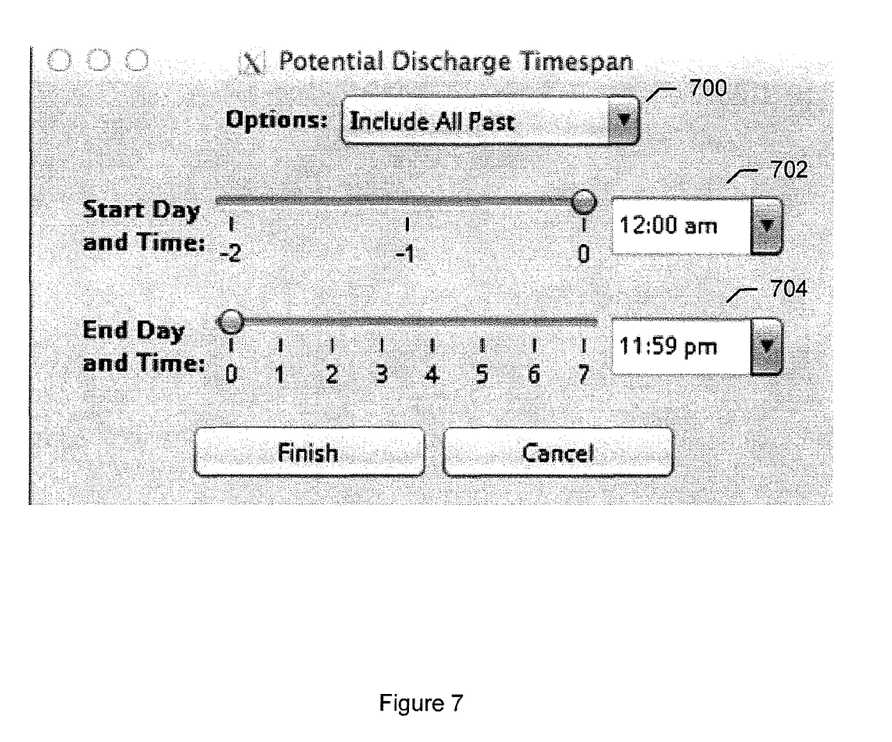

FIG. 7 is an example display for configuring parameters of filtering criteria. The display of FIG. 7 may be displayed in response to selecting of the "Potential Discharge Timespan" filtering criteria in selection box 618 of FIG. 6, for example. Dropdown 700 provides for selection of patients that have a potential discharge time as specified by the user, and may include the options such as include all past," (e.g., prior to a current time), all times, today, and/or a custom time range). Indicators 702 and 704 may provide for entry of a start day and time and end day and time, respectively. In this regard, at least one filtering criteria of the example superview configuration may be to display subunits having a timer for a potential discharge timespan matching the parameters entered in the display of FIG. 7. The display of FIG. 7 is provided merely as an example and it will be appreciated that many other parameters relating to filtering criteria may be set by a user configuring a superview. In some embodiments, a time range relative to a current time (e.g., within the next 2 hours) may be indicated, so as to provide a dynamic time-based filtering criteria that may result in the desired graphical superview following subsequent refreshes.

Figure 8:
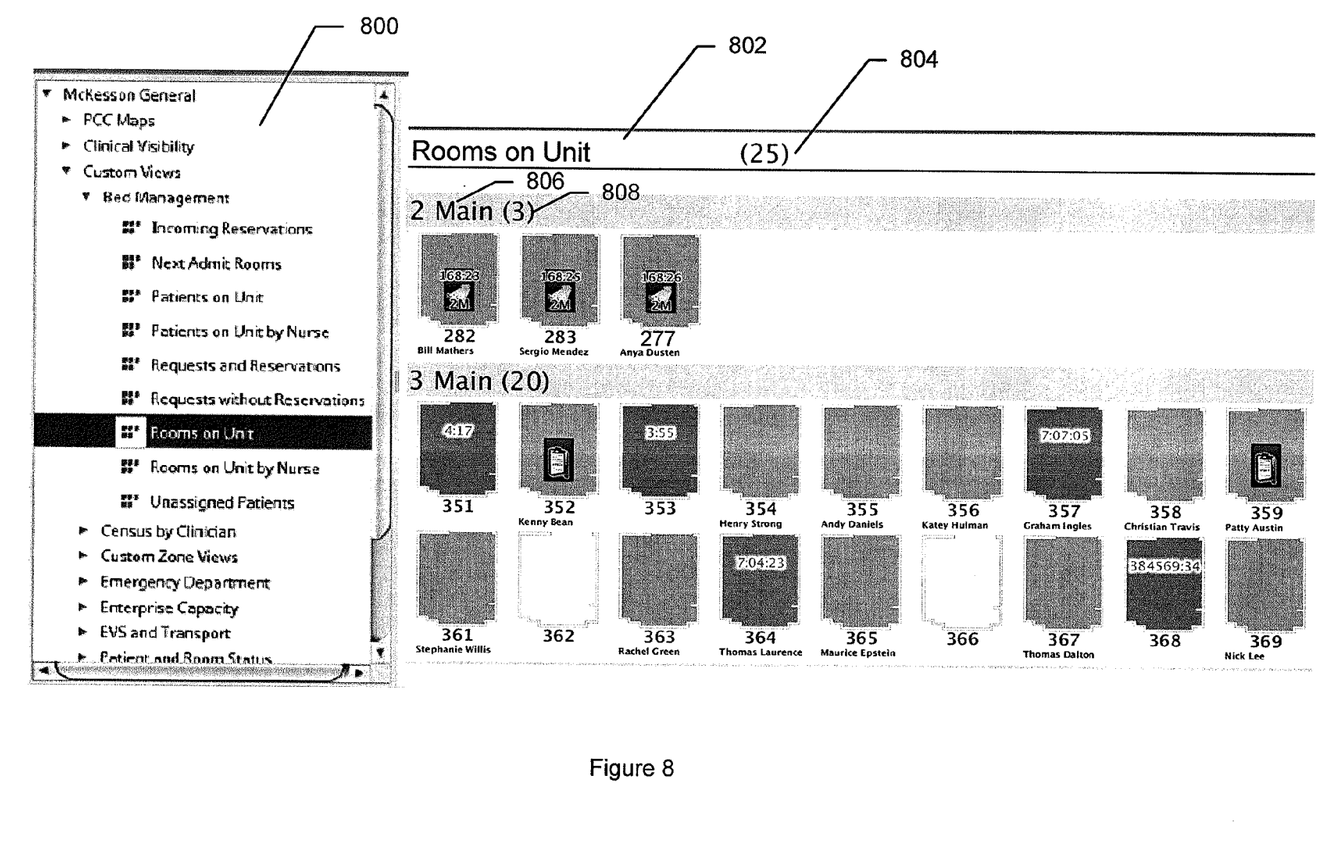
FIG. 8 is an example display of a graphical superview according to some example embodiments.

FIG. 8 is an example display for displaying a graphical superview according to some example embodiments. The menu 800 appearing on the left side of the display may provide a hierarchy of available superviews (also referred to as custom views), which may be grouped based by configurable categories, such as Bed Management. From the menu 800, a user may select to view a particular graphical superview, create a superview configuration, delete a superview configuration, copy a superview configuration as a superview configuration, and/or the like.

As shown by indicator 802, in this example, a user has selected to access a graphical superview named "Rooms on Unit." At the time the graphical superview is generated by the superview server 102, the graphical superview comprises 25 subunits, as indicated by indicator 804. Indicator 808 indicates the number of subunits grouped on the floor or in the specified geographic area described by indicator 806. The displayed subunits belong to the indicated unit(s) and satisfy the filtering criteria, based on the corresponding superview configuration, at the present time the graphical superview is generated and/or displayed.

The current subunits of a graphical superview may be displayed with or without regard to their respective geographical locations. The subunits identified by the graphical superview of FIG. 8 are visually represented independently from their physical locations relative to one another and independently from their respective relative physical locations within a geographic area. In the example graphical superview of FIG. 8, a current subset of subunits (e.g., rooms) are displayed and grouped by unit (e.g., floor number), but without respect to a geospatial arrangement or a floor plan configuration such as provided in FIG. 1. Said differently, although the subunits are grouped by floor number, they may not be positioned by geospatial arrangement or by their physical locations, such as according to a floor plan. The subunits are merely grouped (e.g., placed under a subheading of their respective unit (e.g., floor number or identifier)), but not positioned relative to the geographic location of one another, such as according to their respective floor plans.

In some examples, the subunits may be displayed with respect to their geographic locations (not shown). In such examples, the graphical superview may represent a floor plan or similar layout, but subunits not satisfying the filtering criteria at the given time the graphical superview was created and/or displayed, may be absent from the graphical superview.

In some embodiments, the selected subunits may be a subset of available subunits in which the subset includes less than all of the available subunits. The available subunits may include all rooms on a floor or all rooms in a building, for example. Based on the example graphical superview of FIG. 8, only a subset of all available rooms on "2 Main," and "3 Main" are selected as subunits. In such embodiments, the visual representation may include only the subset of subunits currently satisfying the filtering criteria, as opposed to all known subunits belonging to the at least one unit indicated in the associated superview configuration.

A user may therefore access a consolidated view of pertinent information regarding the subunits (e.g., rooms) that satisfy the filtering criteria at a given time. The subunits may comprise or convey the display fields as indicated by the superview configuration. For example, in the graphical superview of FIG. 8, the display fields include a room number and patient name. The subunits may be color coded to indicate a categorical display field, such as room status. Some particular rooms have associated icons indicating specific alerts or timers. Any third party systems and/or the like may provide information to the superview server 102, so that the most recent information may be reflected in the graphical superview and the appropriate subunit. Upon a refresh of the graphical superview, some subunits may disappear or appear relative to the previous display of the graphical superview. Some information displayed relative to particular subunits may also update as information provided to the superview server 102 is updated. The graphical superview therefore provides pertinent information to a user in a consolidated view, providing an efficient method for tracking up to date information relating to managing rooms located in different areas of a building.

Example embodiments provide for efficient, on-the-fly creation and display of superviews of geospatial arrangements, whereby the superview server 102 may provide real-time or near real-time graphical superviews. The superview server 102 may be preconfigured to automatically perform the operations of FIGS. 4 and/or 5, described above. Users of the client terminal 110 may therefore create new superview configurations remotely from the superview server 102. The preconfigured superview server 102 may automatically perform the operations of FIGS. 4 and 5, including causing the display of the corresponding graphical superview on a remote client terminal 110, without the need for a build to the superview server 102.

Other processes requesting custom views of geospatial arrangements may be inefficient due to the necessity of building hard coded SQL (including a where clause) to a server each time a user requests a custom view to be displayed based on specific parameters. Such a build may expose the server, client terminal, and/or other related systems to downtime, software defects, performance issues, and/or other side effects. Querying a remote database with an SQL query including a where clause may be expensive (e.g., relatively slow and/or resource intensive) as it may require heavyweight computations to be performed on the database, and may negatively impact system performance. Such implementations may make on-the-fly requests for custom views nearly impossible to provide. Embodiments provided herein may alleviate the server of such exposure and provide a seamless, efficient process by which users may configure and customize superviews of geospatial arrangements.

FIGS. 4 and 5 illustrate operations of a method, apparatus, and computer program product according to some example embodiments. It will be understood that each operation of the flowcharts or diagrams, and combinations of operations in the flowcharts or diagrams, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may comprise one or more memory devices of a computing device (for example, memory 214) storing instructions executable by a processor in the computing device (for example, by processor 212). In some example embodiments, the computer program instructions of the computer program product(s) which embody the procedures described above may be stored by memory devices of a plurality of computing devices. As will be appreciated, any such computer program product may be loaded onto a computer or other programmable apparatus (for example, superview server 102, and/or client terminal 110) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus (for example, superview server 102, client terminal 110, and/or other apparatus) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims.

Although specific terms are employed herein, they are used in a generic and descriptive sense only and not for purposes of limitation.

That which is claimed:

1. A method for providing a superview of a geospatial arrangement, the method comprising:
    receiving an indication of a) at least one unit, and b) filtering criteria for filtering subunits of the at least one unit, wherein the unit and subunits are defined based on a physical location;
    saving the indications of the at least one unit and the filtering criteria as a superview configuration;
    marshalling data associated with the at least one unit from a remote storage device;
    unmarshalling the marshalled data and storing resulting data onto a local memory of a computing device, wherein the resulting data comprises a record for each subunit represented in the marshalled data; and
    with a processor of the computing device, filtering the resulting data based on the filtering criteria to identify a current subset of the subunits of the at least one unit, wherein the filtering comprises:
    (a) saving an inclusion indicator on the computing device in association with each of the records, wherein each of the inclusion indicators is initially set to false;
    (b) processing each of the records to determine whether a particular record satisfies the filtering criteria and is associated with the at least one unit;
    (c) if the particular record satisfies the filtering criteria, changing the inclusion indicator of the particular record to true; and
    (d) identifying the current subset of subunits based on the inclusion indicators of the respective records, and wherein the method further comprises
    causing display of a graphical superview, wherein the graphical superview comprises a visual representation of the current subset of subunits.

2. The method of claim 1, wherein the marshalling is performed without respect to the filtering criteria and without respect to the at least one unit.

3. The method of claim 1, wherein each of the subunits of the current subset of subunits is positioned within the graphical superview without respect to their corresponding geospatial arrangements.

4. The method of claim 1, further comprising;
    receiving an indication of a refresh interval for the graphical superview;
    in response to a passing of the refresh interval, repeating the marshalling, the unmarshalling, the storing resulting data, and the filtering to identify a new subset of the subunits; and
    causing the display of the graphical superview to be updated based on the new subset of subunits.

5. The method of claim 1, wherein the filtering criteria comprises a time range, and the current subset of the subunits is identified based on a timer of each respective subunit.

6. The method of claim 1, wherein the computing device is preconfigured to automatically perform:
    the receiving of the indication of the at least one unit and the filtering criteria, wherein the indication of the at least on unit and the filtering criteria are received from a remote user device;
    the saving of the indications as a superview configuration;
    the marshalling of the data from the remote storage device;
    the unmarshalling of the marshalled data;

the storing of the resulting data, wherein the storing comprises writing the resulting data to volatile memory of the computing device, and the causing display of the graphical superview on at least one of the remote user device or another remote user device.

7. An apparatus for providing a superview of a geospatial arrangement, the apparatus comprising at least one processor and at least one memory, configured to cause the apparatus to perform at least:

receiving an indication of a) at least one unit, and b) filtering criteria for filtering subunits of the at least one unit, wherein the unit and subunits are defined based on a physical location;

saving the indications of the at least one unit and the filtering criteria as a superview configuration;

marshalling data associated with the at least one unit from a remote storage device;

unmarshalling the marshalled data and storing resulting data onto a local memory of a computing device, wherein the resulting data comprises a record for each subunit represented in the marshalled data; and filtering the resulting data based on the filtering criteria to identify a current subset of the subunits of the at least one unit, wherein the filtering comprises:

(a) saving an inclusion indicator on the computing device in association with each of the records, wherein each of the inclusion indicators is initially set to false;

(b) processing each of the records to determine whether a particular record satisfies the filtering criteria and is associated with the at least one unit;

(c) if the particular record satisfies the filtering criteria, changing the inclusion indicator of the particular record to true; and (d) identifying the current subset of subunits based on the inclusion indicators of the respective records, and wherein the at least one processor is further configured to cause the apparatus to perform:

causing display of a graphical superview, wherein the graphical superview comprises a visual representation of the current subset of subunits.

8. The apparatus of claim 7, wherein the marshalling is performed without respect to the filtering criteria and without respect to the at least one unit.

9. The apparatus of claim 7, wherein each of the subunits of the current subset of subunits is positioned within the graphical superview without respect to their corresponding geospatial arrangements.

10. The apparatus of claim 7, wherein the at least one processor is further configured to cause the apparatus to perform at least:

receiving an indication of a refresh interval for the graphical superview;

in response to a passing of the refresh interval, repeating the marshalling, the unmarshalling, the storing resulting data, and the filtering to identify a new subset of the subunits; and causing the display of the graphical superview to be updated based on the new subset of subunits.

11. The apparatus of claim 7, wherein the filtering criteria comprises a time range, and the current subset of the subunits is identified based on a timer of each respective subunit.

12. The apparatus of claim 7, wherein the apparatus is preconfigured to automatically perform:

the receiving of the indication of the at least one unit and the filtering criteria, wherein the indication of the at least on unit and the filtering criteria are received from a remote user device;

the saving of the indications as a superview configuration;

the marshalling of the data from the remote storage device;

the unmarshalling of the marshalled data;

the storing of the resulting data, wherein the storing comprises writing the resulting data to volatile memory of the apparatus, and the causing display of the graphical superview on at least one of the remote user device or another remote user device.

13. A computer program product for providing a superview of a geospatial arrangement, the computer program product comprising at least one non-transitory computer-readable medium having computer-readable program instructions stored therein, the computer-readable program instructions comprising instructions, which when performed by an apparatus, are configured to cause the apparatus to perform at least:

receiving an indication of a) at least one unit, and b) filtering criteria for filtering subunits of the at least one unit, wherein the unit and subunits are defined based on a physical location;

saving the indications of the at least one unit and the filtering criteria as a superview configuration;

marshalling data associated with the at least one unit from a remote storage device;

unmarshalling the marshalled data and storing resulting data onto a local memory of a computing device, wherein the resulting data comprises a record for each subunit represented in the marshalled data; and filtering the resulting data based on the filtering criteria to identify a current subset of the subunits of the at least one unit, wherein the filtering comprises:

(a) saving an inclusion indicator on the apparatus in association with each of the records, wherein each of the inclusion indicators is initially set to false;

(b) processing each of the records to determine whether a particular record satisfies the filtering criteria and is associated with the at least one unit;

(c) if the particular record satisfies the filtering criteria, changing the inclusion indicator of the particular record to true; and (d) identifying the current subset of subunits based on the inclusion indicators of the respective records, and wherein the computer-readable program instructions further comprise instructions, which when performed by an apparatus, are configured to cause the apparatus to perform:

causing display of a graphical superview, wherein the graphical superview comprises a visual representation of the current subset of subunits.

14. The computer program product of claim 13, wherein the marshalling is performed without respect to the filtering criteria and without respect to the at least one unit.

15. The computer program product of claim 13, wherein each of the subunits of the current subset of subunits is positioned within the graphical superview without respect to their corresponding geospatial arrangements.

16. The computer program product of claim 13, wherein the computer-readable program instructions further comprise instructions, which when performed by an apparatus, are configured to cause the apparatus to perform at least:

receiving an indication of a refresh interval for the graphical superview;

in response to a passing of the refresh interval, repeating the marshalling, the unmarshalling, the storing resulting data, and the filtering to identify a new subset of the subunits; and causing the display of the graphical superview to be updated based on the new subset of subunits.

17. The computer program product of claim 13, wherein the filtering criteria comprises a time range, and the current subset of the subunits is identified based on a timer of each respective subunit.

18. The computer program product of claim 13, wherein the apparatus is preconfigured to automatically perform:

the receiving of the indication of the at least one unit and the filtering criteria, wherein the indication of the at least on unit and the filtering criteria are received from a remote user device;

the saving of the indications as a superview configuration;

the marshalling of the data from the remote storage device;

the unmarshalling of the marshalled data;

the storing of the resulting data, wherein the storing comprises writing the resulting data to volatile memory of the apparatus, and the causing display of the graphical superview on at least one of the remote user device or another remote user device.

19. A system for providing a superview of a geospatial arrangement, the system including:

a) an apparatus comprising at least one processor and at least one memory configured to cause the apparatus to perform:

receiving an indication of a) at least one unit, and b) filtering criteria for filtering subunits of the at least one unit, wherein the unit and subunits are defined based on a physical location; and transmitting the indications of the at least one unit and the filtering criteria to a server;

b) the server, wherein the server comprises at least one processor and at least one memory device, and is configured for:

receiving the indications of the at least one unit and the filtering criteria;

saving the indications of the at least one unit and the filtering criteria as a superview configuration;

marshalling data associated with the at least one unit from a remote storage device;

unmarshalling the marshalled data and storing resulting data onto a local memory of the server, wherein the resulting data comprises a record for each subunit represented in the marshalled data; and filtering the resulting data based on the filtering criteria to identify a current subset of the subunits of the at least one unit, where in the filtering comprises:

(a) saving an inclusion indicator in association with each of the records, wherein each of the inclusion indicators is initially set to false;

(b) processing each of the records to determine whether a particular record satisfies the filtering criteria and is associated with the at least one unit;

(c) if the particular record satisfies the filtering criteria, changing the (d) identifying the current subset of subunits based on the inclusion indicators of the respective records; and wherein the server is further configured for causing display of a graphical superview on at least one of the apparatus or another user device, wherein the graphical superview comprises a visual representation of the current subset of subunits.

\* \* \* \* \*

UNITED STATES PATENT AND TRADEMARK OFFICE
CERTIFICATE OF CORRECTION

PATENT NO. : 9,690,876 B2  
APPLICATION NO. : 14/211331  
DATED : June 27, 2017  
INVENTOR(S) : Self et al.

Page 1 of 1

It is certified that error appears in the above-identified patent and that said Letters Patent is hereby corrected as shown below:

In the Claims

Column 19, Claim 7:  
Line 21, "a computing device" should read --the apparatus--;  
Line 27, "computing device" should read --apparatus--.

Column 20, Claim 13:  
Line 33, "a computing device" should read --the apparatus--.

Column 22, Claim 19:  
Line 20, "where in" should read --wherein--;  
Line 28, after "changing the" insert --inclusion indicator of the particular record to true; and--.

Signed and Sealed this  
Twenty-seventh Day of March, 2018

Andrei Iancu  
*Director of the United States Patent and Trademark Office*